(12) United States Patent
Maru et al.

(10) Patent No.: US 12,725,494 B2
(45) Date of Patent: Sep. 1, 2026

(54) INTERFERENCE MITIGATION IN AN IMPEDANCE SENSING SYSTEM

(71) Applicant: Cirrus Logic International Semiconductor Ltd., Edinburgh (GB)

(72) Inventors: Siddharth Maru, Austin, TX (US); Tejasvi Das, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 685 days.

(21) Appl. No.: 17/726,920

(22) Filed: Apr. 22, 2022

(65) Prior Publication Data

US 2023/0252865 A1 Aug. 10, 2023

Related U.S. Application Data

(60) Provisional application No. 63/308,230, filed on Feb. 9, 2022.

(51) Int. Cl.
*G08B 6/00* (2006.01)
*G06F 3/01* (2006.01)

(52) U.S. Cl.
CPC .............. *G08B 6/00* (2013.01); *G06F 3/016* (2013.01)

(58) Field of Classification Search
CPC ................................ G08B 6/00; G06F 3/016
USPC ...................................................... 340/407.1
See application file for complete search history.

(56) References Cited

U.S. PATENT DOCUMENTS

2010/0008217 A1* 1/2010 Ding ...................... H04L 1/206 370/210
2012/0229264 A1* 9/2012 Company Bosch .. B06B 1/0253 340/407.1
2020/0363891 A1* 11/2020 Yancey ............. G01R 27/2605
2020/0412222 A1* 12/2020 Tarelli .................... H02K 33/16
2022/0029505 A1 1/2022 Khenkin et al.

FOREIGN PATENT DOCUMENTS

EP 3179335 A1 * 6/2017 ............ G06F 3/016
EP 3179335 B1 * 3/2020 ............ G06F 3/016
WO WO-2009124297 A1 * 10/2009 .......... A61B 5/0022

OTHER PUBLICATIONS

International Search Report and Written Opinion of the International Searching Authority, International Application No. PCT/US2022/051929, mailed Apr. 3, 2023.

* cited by examiner

*Primary Examiner* — Quan Zhen Wang
*Assistant Examiner* — Mancil Littlejohn, Jr.
(74) *Attorney, Agent, or Firm* — Jackson Walker L.L.P.

(57) ABSTRACT

A system may include driving circuitry configured to drive a driving signal to an output transducer, sensing circuitry configured to sense a physical quantity associated with the output transducer in response to the driving signal, and interference detection circuitry configured to detect the presence of interference of the system and mitigate the effect of the interference in the system.

25 Claims, 3 Drawing Sheets

INTERFERENCE MITIGATION IN AN IMPEDANCE SENSING SYSTEM

RELATED APPLICATION

The present disclosure claims priority to U.S. Provisional Patent Application Ser. No. 63/308,230, filed Feb. 9, 2022, which is incorporated by reference herein in its entirety.

FIELD OF DISCLOSURE

The present disclosure relates in general to methods, apparatuses, or implementations for monitoring loads with complex impedances. Embodiments set forth herein may also disclose improvements for mitigating noise and other interference that may negatively affect accuracy and precision measurement of complex impedance.

BACKGROUND

Vibro-haptic transducers, for example linear resonant actuators (LRAs), are widely used in portable devices such as mobile phones to generate vibrational feedback to a user. Vibro-haptic feedback in various forms creates different feelings of touch to a user's skin and may play increasing roles in human-machine interactions for modern devices.

An LRA may be modelled as a mass-spring electro-mechanical vibration system. When driven with appropriately designed or controlled driving signals, an LRA may generate certain desired forms of vibrations. For example, a sharp and clear-cut vibration pattern on a user's finger may be used to create a sensation that mimics a mechanical button click. This clear-cut vibration may then be used as a virtual switch to replace mechanical buttons.

FIG. 1 illustrates an example of a vibro-haptic system in a device 100. Device 100 may comprise a controller 101 configured to control a signal applied to an amplifier 102. Amplifier 102 may then drive a vibrational actuator (e.g., haptic transducer) 103 based on the signal. Controller 101 may be triggered by a trigger to output to the signal. The trigger may, for example, comprise a pressure or force sensor on a screen or virtual button of device 100.

Among the various forms of vibro-haptic feedback, tonal vibrations of sustained duration may play an important role to notify the user of the device of certain predefined events, such as incoming calls or messages, emergency alerts, and timer warnings, etc. In order to generate tonal vibration notifications efficiently, it may be desirable to operate the haptic actuator at its resonance frequency.

The resonance frequency $f_0$ of a haptic transducer may be approximately estimated as:

$$f_0 = \frac{1}{2\pi\sqrt{CM}} \tag{1}$$

where C is the compliance of the spring system, and M is the equivalent moving mass, which may be determined based on both the actual moving part in the haptic transducer and the mass of the portable device holding the haptic transducer.

Due to sample-to-sample variations in individual haptic transducers, mobile device assembly variations, temporal component changes caused by aging, and use conditions such as various different strengths of a user gripping of the device, the vibration resonance of the haptic transducer may vary from time to time.

FIG. 2 illustrates an example of a linear resonant actuator (LRA) modelled as a linear system. LRAs are non-linear components that may behave differently depending on, for example, the voltage levels applied, the operating temperature, and the frequency of operation. However, these components may be modelled as linear components within certain conditions. In this example, the LRA is modelled as a third order system having electrical and mechanical elements. In particular, Re and Le are the DC resistance and coil inductance of the coil-magnet system, respectively; and Bl is the magnetic force factor of the coil. The driving amplifier outputs the voltage waveform V(t) with the output impedance Ro. The terminal voltage $V_T(t)$ may be sensed across the terminals of the haptic transducer. The mass-spring system 201 moves with velocity u(t).

A haptic system may require precise control of movements of the haptic transducer. Such control may rely on the magnetic force factor Bl, which may also be known as the electromagnetic transfer function of the haptic transducer. In an ideal case, magnetic force factor Bl can be given by the product B·l, where B is magnetic flux density and l is a total length of electrical conductor within a magnetic field. Both magnetic flux density B and length l should remain constant in an ideal case with motion occurring along a single axis.

In generating haptic vibration, an LRA may undergo displacement. In order to protect an LRA from damage, such displacement may be limited. Accordingly, accurate measurement of displacement may be crucial in optimizing LRA displacement protection algorithms. Accurate measurement of displacement may also enable increased drive levels of the LRA. While existing approaches measure displacement, such approaches have disadvantages. For example, displacement may be measured using a Hall sensor, but Hall sensors are often costly to implement.

SUMMARY

In accordance with the teachings of the present disclosure, the disadvantages and problems associated with existing approaches for monitoring a complex impedance may be reduced or eliminated.

In accordance with embodiments of the present disclosure, a system may include driving circuitry configured to drive a driving signal to an output transducer, sensing circuitry configured to sense a physical quantity associated with the output transducer in response to the driving signal, and interference detection circuitry configured to detect the presence of interference of the system and mitigate the effect of the interference in the system.

In accordance with these and other embodiments of the present disclosure, a method may include sensing a physical quantity associated with an output transducer in response to a driving signal to an output transducer, detecting the presence of interference of a system comprising the output transducer, and mitigating the effect of the interference in the system.

In accordance with these and other embodiments of the present disclosure, an integrated circuit may include sensing circuitry configured to sense a physical quantity associated with an output transducer in response to a driving signal to an output transducer and interference detection circuitry configured to detect the presence of interference of a system comprising the output transducer and mitigate the effect of the interference in the system.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
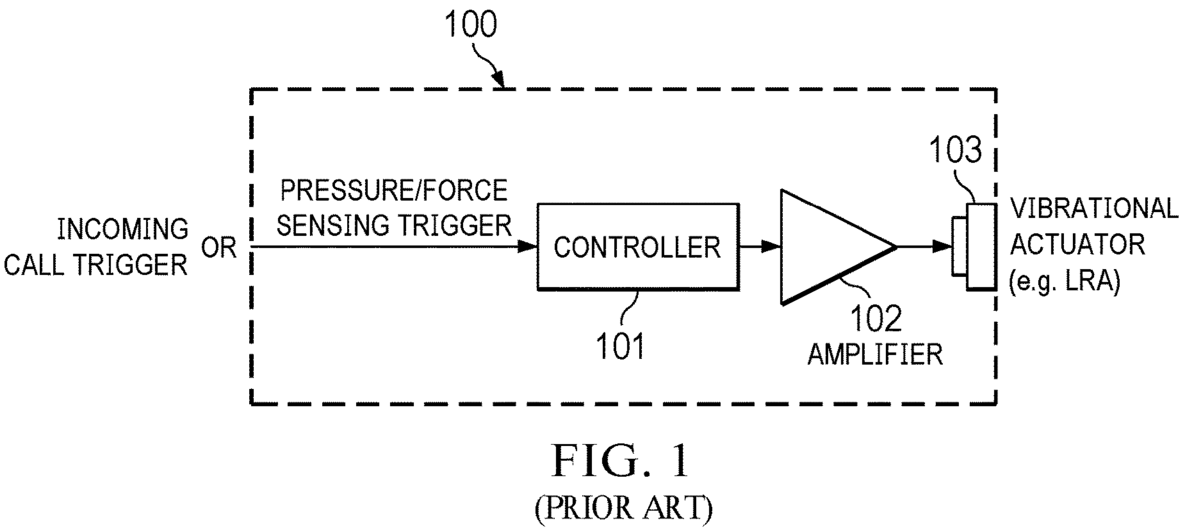
FIG. 1 illustrates an example of a vibro-haptic system in a device, as is known in the art.
Figure 2:
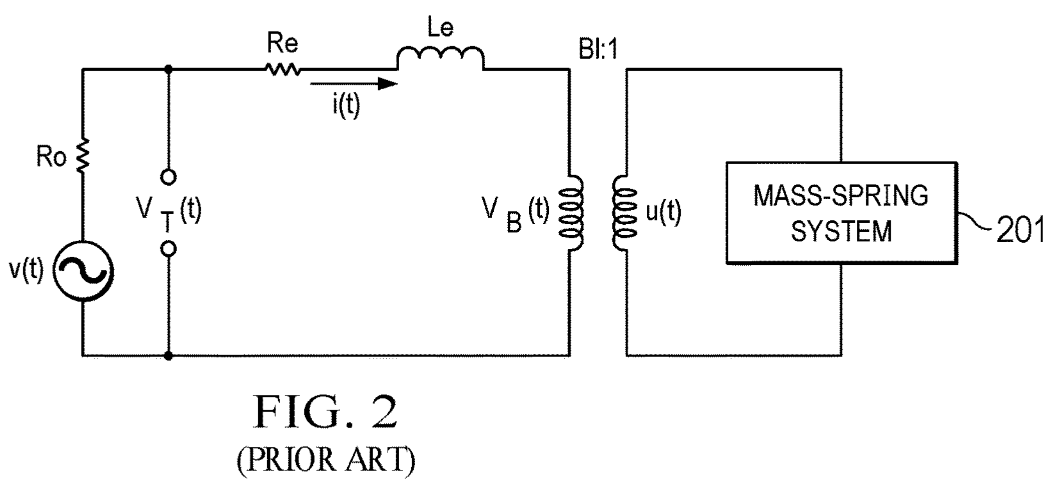
FIG. 2 illustrates an example of a Linear Resonant Actuator (LRA) modelled as a linear system, as is known in the art.

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiment discussed below, and all such equivalents should be deemed as being encompassed by the present disclosure.

Various electronic devices or smart devices may have transducers, speakers, and acoustic output transducers, for example any transducer for converting a suitable electrical driving signal into an acoustic output such as a sonic pressure wave or mechanical vibration. For example, many electronic devices may include one or more speakers or loudspeakers for sound generation, for example, for playback of audio content, voice communications and/or for providing audible notifications.

Such speakers or loudspeakers may comprise an electromagnetic actuator, for example a voice coil motor, which is mechanically coupled to a flexible diaphragm, for example a conventional loudspeaker cone, or which is mechanically coupled to a surface of a device, for example the glass screen of a mobile device. Some electronic devices may also include acoustic output transducers capable of generating ultrasonic waves, for example for use in proximity detection-type applications and/or machine-to-machine communication.

Many electronic devices may additionally or alternatively include more specialized acoustic output transducers, for example, haptic transducers, tailored for generating vibrations for haptic control feedback or notifications to a user. Additionally or alternatively, an electronic device may have a connector, e.g., a socket, for making a removable mating connection with a corresponding connector of an accessory apparatus, and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic or haptic transducers, the driving signal may generally be an analog time varying voltage signal, for example, a time varying waveform.

To accurately sense displacement of an electromagnetic load, methods and systems of the present disclosure may determine an impedance of the electromagnetic load, and then convert the impedance to a position signal, as described in greater detail below. Further, to measure impedance of an electromagnetic load, methods and systems of the present disclosure may utilize either a phase measurement approach and/or a high-frequency pilot-tone driven approach, as also described in greater detail below.

To illustrate, an electromagnetic load may be driven by a driving signal V(t) to generate a sensed terminal voltage $V_T(t)$ across a coil of the electromagnetic load. Sensed terminal voltage $V_T(t)$ may be given by:

$$V_T(t) = Z_{COIL} I(t) + V_B(t)$$

wherein I(t) is a sensed current through the electromagnetic load, $Z_{COIL}$ is an impedance of the electromagnetic load, and $V_B(t)$ is the back-electromotive force (back-EMF) associated with the electromagnetic load.

As used herein, to "drive" an electromagnetic load means to generate and communicate an actuation signal to the electromagnetic load to cause displacement of a movable mass of the electromagnetic load. Further, to "drive" an electromagnetic load may also mean driving of a pilot signal or other test signal to the electromagnetic load from which electrical parameters of the electromagnetic load may be measured.

Because back-EMF voltage $V_B(t)$ may be proportional to velocity of the moving mass of the electromagnetic load, back-EMF voltage $V_B(t)$ may in turn provide an estimate of such velocity. Thus, velocity of the moving mass may be recovered from sensed terminal voltage $V_T(t)$ and sensed current I(t) provided that either: (a) sensed current I(t) is equal to zero, in which case $V_B(t)=V_T(t)$; or (b) coil impedance $Z_{COIL}$ is known or is accurately estimated.

Position of the moving mass may be related to an impedance of the electromagnetic load, including a coil inductance $L_{COIL}$ of the electromagnetic load. At high frequencies significantly above the bandwidth of the electromagnetic load, back-EMF voltage $V_B(t)$ may become negligible and inductance may dominate the coil impedance $Z_{COIL}$. Sensed terminal voltage $V_{T@HF}(t)$ at high frequencies may be estimated by:

$$V_{T@HF}(t) = Z_{COIL} I_{@HF}(t)$$

An inductance component of coil impedance $Z_{COIL}$ may be indicative of a position or a displacement of the moving mass of the electromagnetic load. To illustrate, such inductance may be a nominal value when the moving mass is at rest. When the mass moves, the magnetic field strength may be modulated by the position of the mass which leads to a small alternating-current (AC) modulation signal of the inductance that is a function of the mass position.

Hence, at high frequencies, the position of the moving mass of the electromagnetic load may be recovered from sensed terminal voltage $V_T(t)$ and sensed current I(t) by: (a)

estimating the coil impedance at high frequency as $Z_{COIL@HF} \approx R_{@HF}+L_{@HF}\cdot s$, where $R_{@HF}$ is the resistive part of the coil impedance at high frequency, $L_{@HF}$ is the coil inductance at high frequency, and s is the Laplace transform; and (b) converting the measured inductance to a position signal. Velocity and/or position may be used to control vibration of the moving mass of the electromagnetic load.

Figure 3:
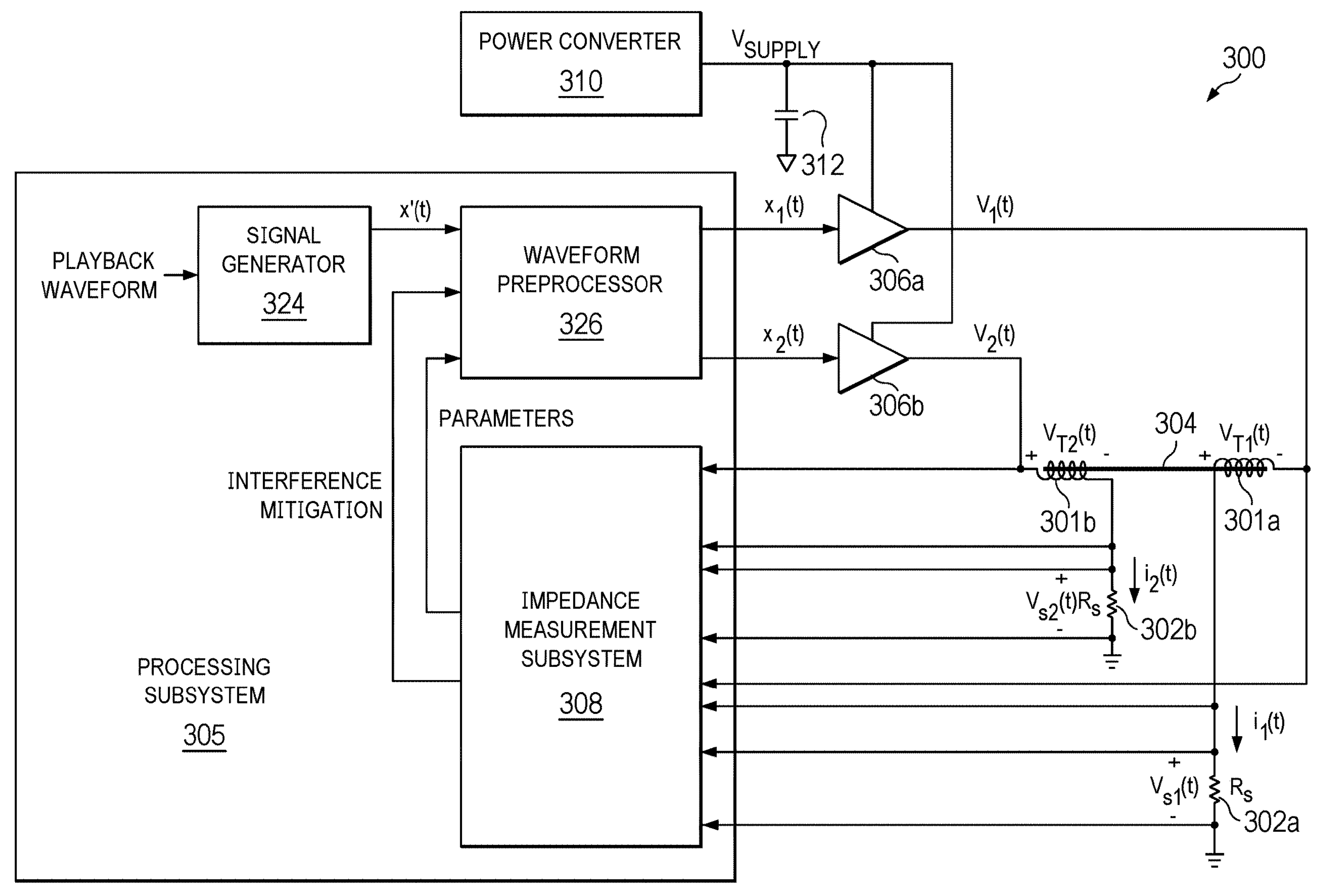
FIG. 3 illustrates selected components of an example host device, in accordance with embodiments of the present disclosure.

FIG. 3 illustrates selected components of an example host device 300 having an electromagnetic actuator 304. Host device 300 may include, without limitation, a mobile device, home application, vehicle, and/or any other system, device, or apparatus that includes a human-machine interface. Electromagnetic actuator 304 may include any suitable load with a complex impedance, including without limitation a haptic transducer, a loudspeaker, a microspeaker, a voice-coil actuator, a solenoid, or other suitable transducer.

In operation, a signal generator 324 of a processing subsystem 305 of host device 300 may generate a raw transducer driving signal x'(t) (which, in some embodiments, may be a waveform signal, such as a haptic waveform signal or audio signal). Raw transducer driving signal x'(t) may be generated based on a desired playback waveform received by signal generator 324.

Raw transducer driving signal x'(t) may be received by waveform preprocessor 326 which may modify raw transducer driving signal x'(t) based on parameters received from impedance measurement subsystem 308 and/or based on any other factor in order to generate processed transducer driving signals $x_1(t)$ and $x_2(t)$. For example, such modification may include control of processed transducer driving signals $x_1(t)$ and $x_2(t)$ in order to prevent overexcursion of electromagnetic actuator 304 that could lead to damage. In addition, waveform preprocessor 326 may modify raw transducer driving signal x'(t) based on interference mitigation signals generated based on detected interference and received from impedance measurement subsystem 308, as described in greater detail below.

Processed transducer driving signal $x_1(t)$ may in turn be amplified by amplifier 306*a* to generate a driving signal $V_1(t)$ for driving electromagnetic load 301*a*. Similarly, processed transducer driving signal $x_2(t)$ may in turn be amplified by amplifier 306*b* to generate a driving signal $V_2(t)$ for driving electromagnetic load 301*b*. As shown in FIG. 3, amplifiers 306*a* and 306*b* may be powered from a supply voltage $V_{SUPPLY}$ generated by a power converter 310 or other power source, such that supply voltage $V_{SUPPLY}$ is present across a capacitor 312.

Accordingly, host device 300 may operate such that electromagnetic actuator 304 is alternatingly driven by driving signal $V_1(t)$ and driving signal $V_2(t)$. Thus, host device 300 may operate in a series of alternating phases: a first phase in which driving signal $V_1(t)$ driven to electromagnetic load 301*a* drives electromagnetic actuator 304 and electromagnetic load 301*b* is used to measure a displacement of electromagnetic actuator 304, and a second phase in which driving signal $V_2(t)$ driven to electromagnetic load 301*b* drives electromagnetic actuator 304 and electromagnetic load 301*a* is used to measure a displacement of electromagnetic actuator 304.

A sensed terminal voltage $V_{T1}(t)$ of electromagnetic load 301*a* may be sensed by impedance measurement subsystem 308 (e.g., using a volt-meter). Similarly, sensed current $I_1(t)$ through electromagnetic load 301*a* may be sensed by impedance measurement subsystem 308. For example, current $I_1(t)$ may be sensed by a sense voltage $V_{S1}(t)$ across a shunt resistor 302*a* having resistance $R_s$ coupled to a terminal of electromagnetic load 301*a*.

Likewise, a sensed terminal voltage $V_{T2}(t)$ of electromagnetic load 301*b* may be sensed by impedance measurement subsystem 308 (e.g., using a volt-meter). Similarly, sensed current $I_2(t)$ through electromagnetic load 301*b* may be sensed by impedance measurement subsystem 308. For example, current $I_2(t)$ may be sensed by a sense voltage $V_{S2}(t)$ across a shunt resistor 302*b* having resistance $R_s$ coupled to a terminal of electromagnetic load 301*b*.

Although the foregoing contemplates two sense resistors having resistance $R_s$, it is understood that in some embodiments, a resistance of shunt resistor 302*a* may vary from a resistance of shunt resistor 302*b*. In fact, even if it were desirable to make the resistance of shunt resistor 302*a* identical to the resistance of shunt resistor 302*b*, due to process variations and tolerances, such resistances may differ.

As shown in FIG. 3, and as described in greater detail below, processing subsystem 305 may include an impedance measurement subsystem 308 that may estimate respective coil inductances $L_{COIL}$ of electromagnetic loads 301*a* and 301*b*. From such estimated coil inductance Lcon, impedance measurement subsystem 308 may determine a displacement associated with electromagnetic load 304. Based on such determined displacement, impedance measurement subsystem 308 may communicate one or more parameters to waveform preprocessor 326 (including, without limitation, the value of such displacement), which may cause waveform preprocessor 326 to modify raw transducer driving signal x'(t). In some embodiments, such displacement may also be indicative of a human interaction (e.g., applied force) to electromagnetic actuator 304.

In operation, to estimate impedance $Z_{COIL}$, impedance measurement subsystem 308 may measure impedance in any suitable manner, including without limitation using the approaches set forth in U.S. patent application Ser. No. 17/497,110 filed Oct. 8, 2021, which is incorporated in its entirety by reference herein.

As a particular example, in order to estimate coil impedance $Z_{COIL}$, waveform preprocessor 326 may generate a processed transducer driving signal $x_1(t)$ or $x_2(t)$ (depending on which electromagnetic coil 301 is the actuating coil used to drive movement of electromagnetic load 304 and which electromagnetic coil 301 is used for sensing) comprising a high-frequency stimulus for driving the sensing coil. In response, impedance measurement subsystem 308 may measure impedance of the sensing coil.

Various approaches may be used to estimate coil impedance $Z_{COIL}$, including time and frequency domain methods. For example, frequency domain methods reliant on calculation of a discrete Fourier transform may have an advantage of implicit binning of a frequency spectrum depending on a length of time for which current and voltage samples are collected. As a specific instance, computing a discrete Fourier transform on sensed currents and sensed terminal voltages at a 200-μs duration results in frequency bins of 5 KHz. Additional windowing of a signal prior to application of the discrete Fourier transform may filter out harmonics and attenuate frequencies far from the signal frequency. Accordingly, measurement accuracy when using such an approach may only be affected by interfering energy or noise that falls within a signal bin or at peaks of the windowing function.

Accurate estimation of complex impedance may require noise, offset error, gain error, and/or other interference added by measurement circuitry to be minimized. While offset errors and gain errors may be minimized through calibration, and thermal and quantization noise may be minimized by precision circuit design, supply noise may still cause degradation of measurement performance.

To illustrate such source of supply noise, various components of host device 300 may operate from different power supply rails. For example, amplifiers 306*a* and 306*b* may operate from supply voltage $V_{SUPPLY}$, analog portions of impedance measurement subsystem 308 may operate off an analog supply rail (e.g., analog supply voltage VDDA shown in FIG. 4), and digital portions of impedance measurement subsystem 308 may operate off a digital supply rail (e.g., digital supply voltage VDDD shown in FIG. 4). Noise on any of these rails may introduce additional noise on the measured voltages and currents, thus impacting measurement accuracy.

Further, interfering signals incident on device pins may add measurement noise. In addition, noise present in the boosted supply rail powering amplifiers 306*a* and 306*b* caused by playback of a haptic tone or a pilot tone on one channel may add measurement noise on the impedance sensing circuitry of the other channel.

Other potential sources of interference may include radio frequency interference incident directly on device pins coupled to electromagnetic actuator 304, substrate noise, and/or other stray noise coupling into the sense path from neighboring traces or blocks.

Figure 4:
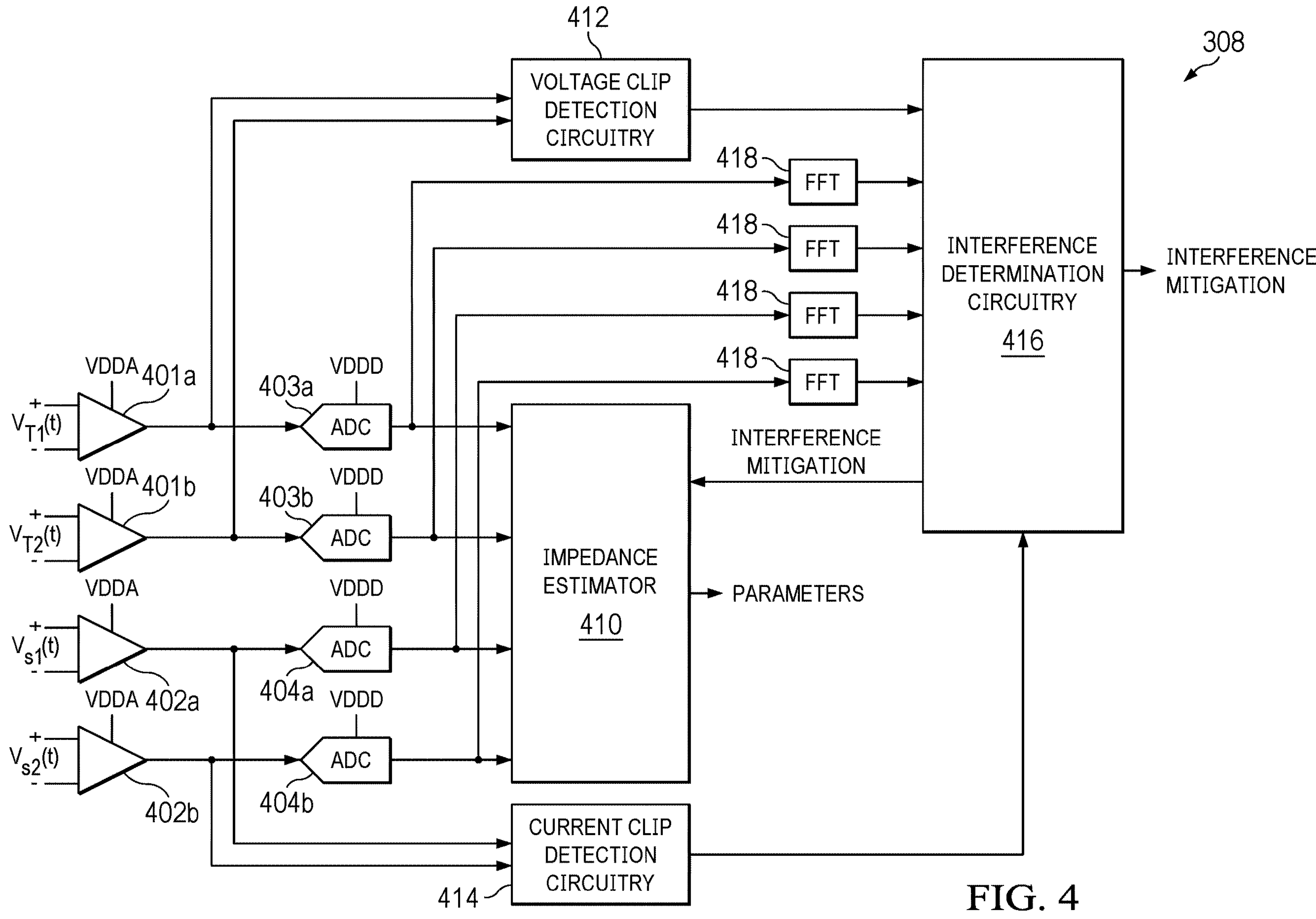
FIG. 4 illustrates selected components of an example impedance measurement subsystem, in accordance with embodiments of the present disclosure.

FIG. 4 illustrates selected components of an example impedance measurement subsystem 308, in accordance with embodiments of the present disclosure. As shown in FIG. 4, sensed terminal voltage $V_{T1}(t)$ of electromagnetic load 301*a* may be conditioned by an analog front end (AFE) 401*a*, and converted to a digital representation of sensed terminal voltage $V_{T1}(t)$ by an analog-to-digital converter (ADC) 403*a*. Likewise, sensed terminal voltage $V_{T2}(t)$ of electromagnetic load 301*b* may be conditioned by an AFE 401*b*, and converted to a digital representation of sensed terminal voltage $V_{T2}(t)$ by an analog-to-digital converter (ADC) 403*b*. Similarly, sensed voltage $V_{S1}(t)$, indicative of current $I_1(t)$, may be conditioned by an AFE 402*a* and converted to a digital representation by an ADC 404*a*. Similarly, sensed voltage $V_{S2}(t)$, indicative of current $I_2(t)$, may be conditioned by an AFE 402*b* and converted to a digital representation by an ADC 404*b*.

The digital representations of sensed terminal voltage $V_{T1}(t)$, sensed terminal voltage $V_{T2}(t)$, sensed voltage $V_{S1}(t)$, and sensed voltage $V_{S2}(t)$ may be received and processed by an impedance estimator 410 that may determine coil impedance $Z_{COIL}$ in accordance with Ohm's law, as described above in greater detail.

As also shown in FIG. 4, impedance measurement subsystem 308 may also include components for detecting and mitigating interference present in host device 300 that may negatively affect measurement accuracy of impedance estimator 410, including those sources of interference described above. For example, impedance measurement subsystem 308 may include voltage clip detection circuitry 412, current clip detection circuitry 414, and interference determination circuitry 416. In operation, a larger than expected in-band signal may result in signal clipping (e.g., desired signal magnitude is greater than a supply voltage such that signal is "clipped" by the magnitude of the supply voltage) at any of AFEs 401*a*, 401*b*, 402*a*, and 402*b* and/or at any of ADCs 403*a*, 403*b*, 404*a*, and 404*d*, thus introducing error into impedance measurement. Given that downstream processing blocks of impedance estimator 410 may be unaware of any upstream clipping, signals measured at the outputs of such processing blocks may not be used to detect the presence of interference. Accordingly, each of voltage clip detection circuitry 412 and current clip detection circuitry 414 may be configured to determine whether signal clipping has occurred in either or both of the measured voltage and current signals, for example by comparing such signals to a threshold equal to the relevant supply voltage (e.g., VDDA) minus a predetermined signal headroom. If one or more of such signals exceeds its respective threshold, interference determination circuitry 416 may determine that interference is present, and generate one or more interference mitigation signals to mitigate the presence of the interference, as described in greater detail below.

As also shown in FIG. 4, impedance measurement subsystem 308 may include a plurality of fast Fourier transform (FFT) blocks 418, each FFT block 418 configured to perform a fast Fourier transform on a respective output of one of ADCs 403*a*, 403*b*, 404*a*, and 404*b*. In addition or alternatively to the clip detection approach described above, interference determination circuitry 416, in concert with FFT blocks 418, may perform a zero signal interference detection when no signal is driven to electromagnetic actuator 304, either as a result of no desired haptic effect being driven to electromagnetic actuator 304 or as a result of a dedicated detection mode in which a zero magnitude signal is driven to electromagnetic actuator 304. When no signal is driven to electromagnetic actuator 304, the measured voltage across an electromagnetic load 301 and the current through such electromagnetic load 301 should both, ideally, be zero. If, however, when no signal is driven to electromagnetic actuator 304, either or both of the measured current and measured voltage are above a respective threshold, then interference determination circuitry 416 may safely conclude that an in-band interferer is present. Such voltage and current comparisons may be performed post-FFT frequency binning of the measured voltage and current signals, to compare the signal magnitude in each bin to a threshold to ensure any interfering signal in a band of interest is measured and identified.

Although FIG. 4 depicts FFT blocks 418 as being outside of impedance estimator 410, in some embodiments, FFT blocks 418 may be integral to impedance estimator 410.

In addition or alternatively to the clip detection approach and/or zero signal detection approach described above, interference determination circuitry 416, in concert with FFT blocks 418, may perform a direct interferer detection of an interferer. To illustrate, interference determination circuitry 416 may determine a frequency of an interferer by computing a DFT over a longer period of time than that compared to a typical impedance estimation period. Such longer estimation period may divide the frequency spectrum into narrower frequency bins, aiding in pinpointing exact frequency of the interferer relative to signal frequency. For example, an FFT frequency bin may be $f_s/N$ wide, wherein N is the number of FFT points and $f_s$ is the sampling frequency. For a first number $N_1$ of FFT points, any potential interferer falling outside of a frequency bin may be rejected as non-interfering with the signal. However, any interferer falling within the signal bin may be detected by computing a larger FFT with a second number $N_2>N_1$ of FFT points in hopes of placing the signal and the potential interferer in separate frequency bins. The presence of energy in a frequency bin adjacent to the frequency bin of the signal in the larger FFT may identify the presence of an in-band interferer, while the absence of energy in an adjacent bin in the larger FFT may confirm the absence of interfering signals.

Having detected the presence of interference using one or more of the foregoing approaches, interference determination circuitry 416 may mitigate the interference using one or more of the approaches described below, or using any other suitable approach. For example, in some embodiments, interference determination circuitry 416 may mitigate an impact of a signal interferer by increasing amplitude of the signal frequency. In such embodiments, it may be preferable that the amplitude is increased only so long as no clipping occurs in the signal path of the sensing circuitry.

As another example, in these and other embodiments, interference determination circuitry 416 may mitigate an impact of a signal interferer by modifying the signal frequency such that the signal frequency and the interfering frequency are not in adjacent FFT frequency bins.

As a further example, in these and other embodiments, interference determination circuitry 416 may also cause a filter of impedance estimator 410 to apply a notch or null at the frequency of the interferer in order to further mitigate impact of the signal interferer.

As yet another example, in these and other embodiments, if a source of interference is known, for example a ripple on supply voltage $V_{SUPPLY}$, interference determination circuitry 416 may be configured to cause attenuation of such sources. As a specific example, in the case of interference coming from a ripple on supply voltage $V_{SUPPLY}$, capacitance of capacitor 312 may be variable (e.g., wherein capacitor 312 may be implemented by a parallel combination of switched capacitive elements) and interference determination circuitry 416 may generate one or more interference mitigation control signals (not explicitly shown in FIG. 4) to increase the capacitance of capacitor 312 to reduce the magnitude of the ripple relative to signal amplitude.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:

driving circuitry configured to drive a driving signal to an output transducer;

sensing circuitry configured to sense a physical quantity associated with the output transducer in response to the driving signal; and interference detection circuitry configured to:

detect the presence of interference in the system by directly determining a frequency of the interference by performing a transform on a measured quantity measured by the sensing circuitry and with frequency bins of the transform selected to enable determination of the frequency of the interference by the presence of the interference in a first frequency bin adjacent to a second frequency bin comprising the signal; and mitigate the effect of the interference in the system.

2. The system of claim 1, wherein the output transducer is a haptic actuator.

3. The system of claim 1, wherein the output transducer is an audio transducer.

4. The system of claim 1, wherein the driving signal comprises a pilot tone.

5. The system of claim 1, wherein the physical quantity is an impedance associated with the output transducer.

6. The system of claim 1, wherein the sensing circuitry is configured to sense the physical quantity based on one or more of a voltage associated with the output transducer and a current associated with the output transducer.

7. The system of claim 1, wherein the interference detection circuitry is configured to mitigate the effect of the interference in the system by modifying an amplitude of the driving signal.

8. The system of claim 1, wherein the interference detection circuitry is configured to mitigate the effect of the interference in the system by modifying a frequency of the driving signal.

9. The system of claim 1, wherein the interference detection circuitry is configured to mitigate the effect of the interference in the system by causing the sensing circuitry to attenuate signal energy at the frequency of the interference.

10. The system of claim 1, wherein the interference detection circuitry is configured to mitigate the effect of the interference in the system by attenuating a known source of the interference.

11. The system of claim 1, wherein the interference detection circuitry is configured to detect the presence of interference of the system by detecting signal clipping within a signal sensing path of the sensing circuitry.

12. The system of claim 1, wherein the interference detection circuitry is configured to detect the presence of interference of the system by detecting the presence of an in-band signal above a threshold level in response to the driving signal being of zero magnitude.

13. A method comprising:

sensing a physical quantity associated with an output transducer in response to a driving signal to the output transducer;

detecting the presence of interference in a system comprising the output transducer by directly determining a frequency of the interference by performing a transform on a measured quantity measured by sensing circuitry and with frequency bins of the transform selected to enable determination of the frequency of the interference by the presence of the interference in a first frequency bin adjacent to a second frequency bin comprising the signal; and mitigating the effect of the interference in the system.

14. The method of claim 13, wherein the output transducer is a haptic actuator.

15. The method of claim 13, wherein the output transducer is an audio transducer.

16. The method of claim 13, wherein the driving signal comprises a pilot tone.

17. The method of claim 13, wherein the physical quantity is an impedance associated with the output transducer.

18. The method of claim 13, wherein the sensing circuitry is configured to sense the physical quantity based on one or more of a voltage associated with the output transducer and a current associated with the output transducer.

19. The method of claim 13, wherein the interference detection circuitry is configured to mitigate the effect of the interference in the system by modifying an amplitude of the driving signal.

20. The method of claim 13, wherein the interference detection circuitry is configured to mitigate the effect of the interference in the system by modifying a frequency of the driving signal.

21. The method of claim 13, wherein the interference detection circuitry is configured to mitigate the effect of the interference in the system by causing the sensing circuitry to attenuate signal energy at the frequency of the interference.

22. The method of claim 13, wherein the interference detection circuitry is configured to mitigate the effect of the interference in the system by attenuating a known source of the interference.

23. An integrated circuit comprising:

sensing circuitry configured to sense a physical quantity associated with an output transducer in response to a driving signal to the output transducer; and interference detection circuitry configured to:

detect the presence of interference in a system comprising the output transducer by directly determining a frequency of the interference by performing a transform on a measured quantity measured by the sensing system and with frequency bins of the transform selected to enable determination of the frequency of the interference by the presence of the interference in a first frequency bin adjacent to a second frequency bin comprising the signal; and mitigate the effect of the interference in the system.

24. The method of claim 13, further comprising detecting the presence of interference of the system by detecting signal clipping within a signal sensing path of the sensing circuitry.

25. The method of claim 13, further comprising detecting the presence of interference of the system by detecting the presence of an in-band signal above a threshold level in response to the driving signal being of zero magnitude.

* * * * *